(No Model.)
J. J. SKINNER.
ANIMAL TRAP.
No. 351,810. Patented Nov. 2, 1886.
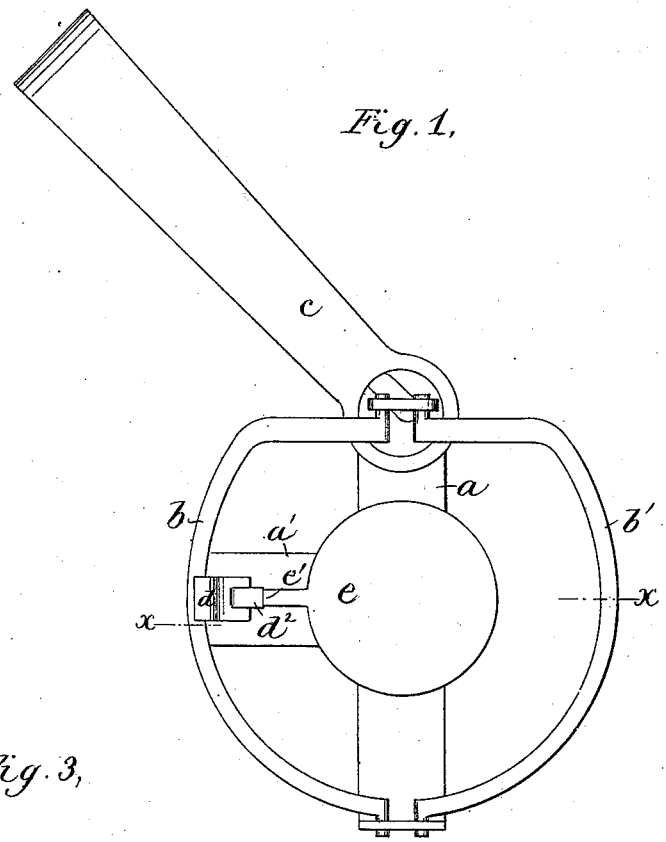
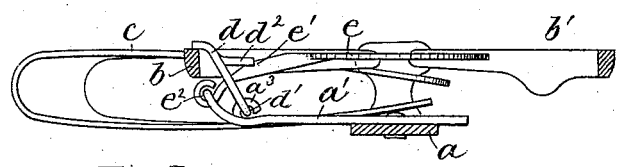
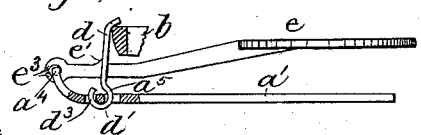
Witnesses,
Jas J. Maloney
A. J. Locke.
Inventor,
Joseph J. Skinner,
by Jos. P. Livermore
Att'y.

UNITED STATES PATENT OFFICE.

JOSEPH J. SKINNER, OF BOSTON, MASSACHUSETTS.

ANIMAL-TRAP.

SPECIFICATION forming part of Letters Patent No. 351,810, dated November 2, 1886.

Application filed March 17, 1886. Serial No. 195,537. (No model.)

*To all whom it may concern:*

Be it known that I, JOSEPH J. SKINNER, of Boston, county of Suffolk, State of Massachusetts, have invented an Improvement in Animal-Traps, of which the following description, in connection with the accompanying drawings, is a specification, like letters on the drawings representing like parts.

My invention relates to traps of that class in which a pair of jaws are actuated by a spring in such manner as to catch the leg of an animal that has stepped between the jaws and sprung the trap by pressing down upon the trigger or bait-pan within the open jaws.

The invention consists, mainly, in a novel construction of the dog or detent and co-operating trigger by which the trap is set and sprung. The dog is pivoted at a point below the level of its point of engagement with the jaw, and the point of engagement of the dog with the trigger is nearly vertically over the pivotal point of the dog. It results from this arrangement that the pressure of the dog on the jaw tends to move the engaging-point of the trigger nearly in a horizontal direction, and the pressure of the dog on the trigger is in a horizontal direction, instead of vertically upward or downward, as is usual in traps of this class. The engaging-shoulder of the trigger is about at right angles to the direction of the pressure of the dog—that is, about vertical—and the parts are so arranged that when the pan is pressed downward the dog is disengaged, and has a movement along the shank or stem of the trigger. The dog is preferably provided with an opening, and the shank or stem of the trigger extended through the said opening and pivoted beyond or outside of the pivoted point of the dog. A trap made in this way is of simple and inexpensive construction, is very easy to set, and not liable to be accidentally sprung, although it may be sprung by very light pressure on the bait-pan or foot-plate of the trigger, if desired.

Figure 1 is a plan view of a trap embodying this invention; Fig. 2, a horizontal section thereof, showing the dog and trigger in elevation; Fig. 3, a perspective view of the dog detached; Fig. 4, a detail showing a portion of the cross-piece of the trap in perspective; and Fig. 5, a detail showing a modification, in which the dog is at the outside, instead of at the inside, of the jaw, as shown in the other figures.

The main portion of the trap, consisting of the frame or base-plate $a$ $a'$, jaws $b$ $b'$, and their actuating-spring $c$, may be of usual construction.

When the trap is set, the spring $c$ is pressed down and the jaws opened, as shown, and one of the said jaws engaged by the dog $d$, which is, in accordance with the present invention, pivoted at $d'$ upon the cross-piece $a'$ of the base-plate below the level of the jaw, the said dog having a lateral projection that engages the jaw. The upper pressure of the jaw on the dog tends to turn the latter on its pivot, and this movement is resisted by the shoulder $e'$ of the trigger or bait-pan $e$, which is pivoted at $e^2$ upon the cross-piece $a'$ of the trap, preferably at a point outside of or further from the middle of the trap than the pivotal point $d'$ of the dog, although it might be pivoted inside of the pivoted point of the dog. The shoulder or engaging point $e'$ of the trigger is nearly directly over the pivotal point $d'$ of the dog, and the pressure of the jaw on the dog tends to swing the latter about its pivot in such a manner that its pressure on the shoulder of the trigger is nearly in a horizontal direction, instead of upward or downward, and the trigger is preferably pivoted at a point nearly in line with the direction of the pressure of the dog upon it. By this arrangement the trigger may be held in engagement with the dog merely by the friction of the engaging-surfaces, in case the pressure is just at right angles to the said surfaces, or these surfaces may be shaped so as to be inclined to the direction of the pressure in such manner that the said pressure tends to hold them in engagement if it is desired to have the trap sprung only when considerable pressure is brought to bear on the trigger, or they may be inclined in the opposite direction, so that the pressure tends to disengage the trigger if it is desired to have the trap spring by very light pressure.

As shown in Figs. 1 to 4 the dog is pivoted inside the jaw and projects outward to engage it, and it has an opening through it and is provided with a bar at the lower end, engaged by a tongue, $a^3$, partially cut from the cross-piece $a'$ and bent around through the opening of the dog, the opening from which the said tongue is cut terminating within the end of the cross-piece, so as to leave the bar $a^4$ at the end of the cross-piece to which the trigger is pivoted. (See Fig. 4.) The dog $d$ may be provided with a projecting tongue or finger, $d^2$, to engage the trigger $e$, and the said finger may be made by striking up a portion of the material of the said dog, as shown in Fig. 3, thus forming at the same time the opening which receives the loop $a^3$, struck from the cross-piece $a'$, as before described.

The trigger and dog may be made of malleable castings, and each provided with fingers or projections $e^3$ and $d^3$, as shown in Fig. 5, that may be bent around bars $a^4$ $a^5$, formed in the cross-piece $a'$ by punching. The finger of the dog may be omitted, as shown in Fig. 5, in which case the shoulder $e'$ of the trigger engages the body of the dog at the upper end of the fork through which the stem of the trigger passes. The trigger may be so connected with the cross bar as to slide thereon to vary the position of its pivotal point, as shown in another application, Serial No. 195,534, filed herewith March 17, 1886, and I do not herein claim such specific construction of the trigger in itself, the present invention being limited to the construction and arrangement of the dog in combination with the framework, jaw, and trigger of the trap.

There are various other modifications in the construction and arrangement of the dog and trigger, which will be readily suggested, and which need not be especially illustrated; and in some cases the dog may be pivoted above the level of the jaw, instead of below it, in which case the engaging-point with the trigger would be beneath instead of directly over the pivot of the dog, the essential features being that the action of the jaw on the dog produces substantially a horizontal instead of a vertical pressure on the engaging-point of the trigger, and when released the engaging-point of the dog moves along the shank or stem of the trigger in a substantially horizontal direction.

The construction of the detent and trigger is very simple and inexpensive, and it holds with certainty when the trap is set, but is released by a very moderate pressure on the trigger or bait-pan, and has no moving parts tending to throw the leg of the animal outside of the jaws as the latter close.

I claim—

1. The combination of the jaws and their actuating-spring with a dog pivoted at a different level from that of its engaging-point with the jaw, and a trigger having its point of engagement with the dog substantially in the same vertical line with the pivotal point of the dog, whereby the latter presses horizontally on the trigger and moves along the shank of the trigger in releasing the jaw, substantially as described.

2. The combination of the jaws and their actuating-spring with the dog having an opening, and the trigger having its shank or stem extended through the opening of the dog and provided with an engaging-shoulder for the said dog, substantially as described.

3. The combination of the base-plate and jaws pivoted thereon, and their actuating-spring, with a trigger pivoted on the cross-piece of the base-plate, and dog co-operating therewith pivoted on the cross-piece of the base-plate between the pivot of the trigger and the middle of the trap, substantially as described.

4. The combination of the base-plate, including a cross-piece having an opening near its end and a tongue cut from it bent to form a pivot-loop, combined with a dog pivoted in said loop and provided with an opening, and a trigger having its shank or stem extended through the opening of the dog and pivoted in the opening of the cross-piece, substantially as described.

5. The combination of the base-plate, including a cross-piece, with the jaws and their actuating-spring and a trigger pivoted in the end of the cross-piece, and dog pivoted at an intermediate point in the cross-piece, substantially as described.

6. The combination of the jaws and their actuating-spring, with the dog pivoted on the frame-work of the trap, and a trigger having a shank pivoted or fulcrumed on the frame-work of the trap and co-operating with said dog, the dog extending from its pivot across the shank of the trigger, as described, whereby the part of the dog that is engaged with the trigger moves in a substantially horizontal direction lengthwise of the shank of the trigger in springing the trap, substantially as described.

In testimony whereof I have signed my name to this specification in the presence of two subscribing witnesses.

JOSEPH J. SKINNER.

Witnesses:
 JOS. P. LIVERMORE,
 H. P. BATES.